United States Patent [19]
Grieb

[11] 3,887,147
[45] June 3, 1975

[54] APPARATUS AND METHOD FOR AUGMENTING THE LIFT OF AN AIRCRAFT HAVING SHORT TAKE-OFF AND LANDING CAPABILITIES

[75] Inventor: Hubert Grieb, Unterpfaffenhofen, Germany

[73] Assignee: Motoren-und Turbinen-Union Munchen GmbH, Germany

[22] Filed: Aug. 13, 1973

[21] Appl. No.: 387,639

[30] Foreign Application Priority Data
Aug. 12, 1972 Germany............................ 2239822

[52] U.S. Cl....... 244/42 CC; 60/226 R; 244/42 CE; 244/42 CF; 244/53 R
[51] Int. Cl...................... B64c 21/04; B64c 21/06
[58] Field of Search....... 244/42 CC, 42 CE, 42 CF, 244/12 R, 12 B, 12 D, 17.19, 52, 53 R; 60/226 R, 229, 263; 415/DIG. 1

[56] References Cited
UNITED STATES PATENTS

| | | | |
|---|---|---|---|
| 2,476,001 | 7/1949 | Stalker............................ | 244/42 CE |
| 2,568,813 | 9/1951 | Lundberg.......................... | 244/52 X |
| 3,018,982 | 1/1962 | Multhopp .................. | 244/42 CF X |
| 3,056,565 | 10/1962 | Griffith ............................ | 60/226 R |
| 3,127,129 | 3/1964 | Petrie................................ | 244/52 X |
| 3,597,102 | 8/1971 | Unsworth et al. .......... | 415/DIG. 1 X |
| 3,761,042 | 9/1973 | Denning......................... | 244/12 D X |

FOREIGN PATENTS OR APPLICATIONS

| | | | |
|---|---|---|---|
| 1,035,485 | 12/1956 | Germany | |
| 743,598 | 1/1956 | United Kingdom ............ | 244/42 CE |
| 739,314 | 10/1955 | United Kingdom................ | 60/226 R |
| 586,572 | 3/1947 | United Kingdom................ | 60/226 R |

Primary Examiner—Trygve M. Blix
Assistant Examiner—Barry L. Kelmachter
Attorney, Agent, or Firm—Craig & Antonelli

[57] ABSTRACT

Apparatus and method for augmenting the lift of an aircraft having cruise engines of the type having a plurality of turbines driven by hot combustion gases from the engine. Compressed air generators are provided separate from the engines at locations within the wing of the aircraft for energizing high lift mechanisms at the upper surface of the wing. These compressed air generators are driven by hot gases extracted from the cruise engines at a position immediately upstream of respective low pressure turbines of the engines. A relatively small hot gas line is extended through engine mounting struts to drive turbines of the compressed air generators. The high lift mechanisms include both boundary layer suction devices and compressed air exhaust devices powered by the compressed air generators. Preferred embodiments include one or both of the boundary layer suction and compressed air exhaust high lift mechanisms.

39 Claims, 9 Drawing Figures

APPARATUS AND METHOD FOR AUGMENTING THE LIFT OF AN AIRCRAFT HAVING SHORT TAKE-OFF AND LANDING CAPABILITIES

BACKGROUND AND SUMMARY OF THE INVENTION

This invention relates to apparatus for augmenting the lift of an STOL (Short Take-off and Landing) aircraft by extracting hot gases from its cruise engines which are preferably multiple-spool, multiple-stream construction.

STOL aircraft which exhaust compressed air from the wing for augmenting the lift during the take-off and landing phases have been contemplated which utilize the following systems for providing the necessary air under pressure:

Compressed air is extracted from the cruise engines and directed into the wing through the engine mounts.

Compressed air is generated by autonomous generator units, i.e., in compressors driven by gas turbines or otherwise.

Hot gas is extracted from the cruise engines for direct exhaust from the wing.

Considering the required amounts of air for augmenting the lift, extraction of compressed air from the cruise engines constitutes a grave degree of interference which has aero-thermodynamic repercussions that must be considered in the design of the engine. Further, directing the necessary amounts of STOL air from the cruise engines into the wing necessitates considerable cross-sectional areas for the air ducting and these make for aerodynamically unfavorable engine mounts. Then when during normal flight no compressed air is needed to generate lift, the extracted amount of air must be directed to a separate thrust nozzle in that closure of the extraction line is ruled out for reasons involving the aerodynamics of the engine. The change-over means for directing to a separate nozzle must be designed for exhausting the compressed air in a forward direction when the thrust is reversed. The change-over means represents a considerable complication of the cruise engine wing arrangement.

Another consideration is that an engine designed for the extraction of considerable amounts of air from the compressor area restricts is potential market to that for STOL aircraft of the just cited specific category. Whereas because of development cost and production quantities the scope of possible applications should be maximally wide. Such an engine should therefore desirably fully qualify for use as a cruise engine also on aircraft of normal take-off capability.

While the installation of autonomous compressed-air generator units does permit the use of cruise engines useable for normal take-off and landing capability, they nevertheless add considerably to the weight. They further require a notable amount of space and complicate the operation and instrumentation of the entire engine plant.

Extraction of considerable amounts of hot gas from the cruise engines for direct exhaust from the wing affects the cruise engine to a less significant degree than does the extraction of compressed air. The hot gas ducting within the wing, however, poses an extraordinarily complicated problem.

The present invention contemplates eliminating the above-discussed disadvantages by providing an apparatus for augmenting the lift of STOL aircraft, said apparatus permitting the use of normal cruise engines optimized for normal flight with a minimum of changes to adapt them to STOL operation, there interference with a normal fuselage/wing/engine arrangement is likewise a minimum. In a preferred arrangement the engines are suspended from the wing by relatively slim struts. This invention further contemplates minimizing the repercussions of engine damage on the propulsion system, when it is particularly intended to eliminate rolling moment.

This invention further contemplates achieving simplicity in development and construction and maximum economy of space needed for additional STOL equipment.

The present invention specifically contemplates providing an arrangement for extracting from a point upstream of the low-pressure turbines of the cruise engines relatively moderate amounts of hot gas to energize turbine systems coupled with compressor when the high-lift means of the aircraft are actuated.

Inasmuch as the cruise engines of modern passenger and freight aircraft are virtually without exception of the two-stream type, the extraction of relatively moderate quantities of hot gas from the hot circuit between the high-pressure and the low-pressure turbine (two-spool construction) or between the intermediate-pressure and the low-pressure turbine (three-spool construction) can be achieved in a simple manner. Moreover, the extraction of moderate gas quantities at said point necessitates no basic change to the engine construction has no grave aerodynamic repercussions on operation with or without extraction provides an opportunity for subsequent, unproblematical adaptation of existing engines to the STOL propulsion system.

It will further be appreciated that the effect of low-percent extraction of hot gas upstream of the low-pressure turbine is slight if not negligible in terms of cruise engine thrust, as will be shown below.

The primary effect of hot gas extraction is a pressure drop upstream of the low-pressure turbine. This in fact lowers the performance of the low-pressure turbine and the thrust of the hot circuit, and it likewise reduces the thrust of the cold or second circuit owing to the lesser output of the fan driven by the low-pressure turbine. As a secondary effect, however, the pressure drop upstream of the low-pressure turbine increases the gradient in the turbines ahead of it and so boosts the performance of the gas generator. When during take-off the cruise engines are controlled so that the maximum allowable temperature into the high pressure turbine is maintained at a constant level, higher speed or performance will result in the gas generator.

In fact, then, the two above-discussed tendencies counteract one another in their effects on the total thrust of a cruise engine, and accordingly no more than a modest loss of thrust is indicated.

The use of the apparatus of this invention will further enable a substantially greater amount of low-energy (cold) compressed air to be generated using the extracted high-energy hot gas stream through a converter consisting of a turbine and a compressor. In a preferred arrangement each cruise engine is associated with such a compressed-air generator. These compressed-air generators conceivably discharge into a manifold extending over the entire wing, from where the air flows to exhaust slots which likewise extend over the entire wing. In this the mass flow parameter $(M\sqrt{T/P})_T$ at the turbine inlet, which is a determinant of the cross-sectional area of the hot gas lines, is substantially smaller than, e.g., the mass flow parameter $(M\sqrt{T/P})_V$ at the compressor outlet, which is a determinant of the compressed air manifold.

Preferred embodiments of the present invention utilize approximately 25% to 28% of the cruise engine hot gas supply for landing and approximately 12% to 13% for take-off, depending on the design pressure ratio at the exhaust slot 35 for the particular configuration. (Pressure ratio at slot 35 in range 1.60 to 1.91).

The apparatus of this invention is equally suited for high-lift generation by sucking off the boundary layer on the wing. In this the compressors of the said compressed-air generators may suck off air from an area downstream of the suction slots or in the interior of the wing.

The apparatus may ultimately be operated also such that the drawn-in boundary layer is pressurized in the compressors of the compressed-air generators and then exhausted at suitable locations through slots, as previously described, to generate lift.

It is also contemplated by the present invention to energize the rudder and the elevator with compressed-air jointly with the wing. In that case the tail controls of STOL aircraft can be made more effective and, therefore, smaller.

When the compressed-air generators are arranged in the wing area, or in or on the wing, the moderate cross-sectional areas of the hot gas lines between the cruise engines and their associated compressed-air generators enable an aerodynamically favorable shape of the engine mounts.

Three-engined STOL aircraft admit of two alternatives in accordance with the present invention:

When all three cruise entines are installed in the tail, their associated converter units or compressed air generators should preferably be installed in the tail as well to keep the hot gas lines as short as possible. In this case the generated compressed air must be directed forward to the wing.

When one engine is installed in the tail and the other two in the wing, only the compressed air supplied by the converter unit of the tail engine must be directed forward.

Shut-off valves in the hot gas lines contemplated by this invention take the form of restrictors, so that during take-off, i.e., at the time of high cruise-engine thrust, the turbines of the compressed-air generators are allowed to operate under restriction, whereas during landing, i.e., with the cruise engine at part power, these restrictor valves are wide open.

It follows that the said STOL apparatus should primarily be conceived with the conditions at landing in mind in that these require the maximum coefficient of lift or the maximum capacity of the compressed-air system and in that at that time the hot gas extracted from the cruise engines at part power possesses the least specific energy.

In this manner the apparatus of this invention requires no control means for operating the compressed-air generators other than the said shut-off and safety means.

Nor will it be necessary with preferred embodiments of this apparatus to interconnect the hot gas lines of the various engine units. When, e.g., an automatically responding check valve is used to separate, in the event of the failure of a cruise engine, its associated compressed-air generator from the compressed-air system, differentiation must be made between two cases:

During take-off the compressed-air generators operate at part-power. Then when one generator unit fails, the restrictors of the remaining generators can be opened sufficiently for the needed quantity of compressed-air to be approximately maintained. The lift system, therefore, will not be impaired.

During landing the cruise engines operate at part-power. If one of the cruise engines fails, the remaining engines must obviously be operated to produce more thrust to offset the loss. It follows that their associated compressed-air generators will equally provide more output, so that as a result the operative compressed-air generators will in the aggregate maintain the lift system at a normal level of power.

Apart from the fact that the available power can be influenced by the restrictors the desirable operating conditions of the additional STOL system become apparent at engine failure from the characteristic performance of the compressed-air circuit which in the event of the failure of one compressed-air generator permits the remaining operative compressed-air generators to discharge, given the necessary available power, a greater volume even though at a reduced pressure ratio.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

(corresponding reference numerals are used throughout the views to designate like parts).

DETAILED DESCRIPTION OF THE DRAWINGS

Figure 1:
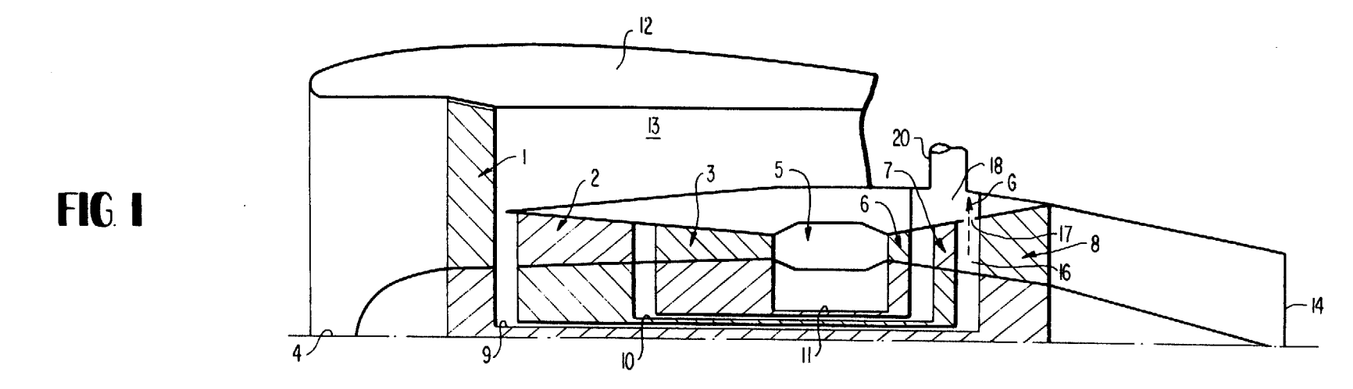
FIG. 1 is a section taken at the engine longitudinal centerline which illustrates the upper half of a schematically arranged turbine jet engine in a first embodiment of the present invention.

FIG. 1 illustrates the apparatus of this invention in conjunction with a three-spool, two-stream cruise engine. This cruise engine essentially comprises, viewed from left to right, a front fan 1, an intermediate-pressure compressor 2, downstream of it a high-pressure compressor 3 and an annular combustion chamber 5 which is here arranged around the longitudinal centerline 4 of the engine.

The annular combustion chamber is followed, in that order, by a high-pressure turbine 6, an intermediate-pressure 7 and a low-pressure turbine 8.

The front fan 1 is driven by the low-pressure turbine 8 with which it is coupled through an inner shaft 9. The intermediate-pressure compressor 2 is driven by the intermediate-pressure turbine 7 through a tubular shaft 10 which extends coaxially with the inner shaft 9. The high-pressure compressor 3 and the high-pressure turbine 6 are connected together through a further tubular shaft 11 which extends coaxially with the tubular shaft 10. The front fan 1 discharges compressed air for the generation of forward thrust to an annulus 13 which is arranged coaxially with the longitudinal centerline 4 of the engine and surrounded by a shroud 12.

The hot gas thrust nozzle of the cruise engine is indicated with the numeral 14.

The hot gases needed to drive the compressed-air generator 15 for the lift augmentation (FIG. 5) are extracted from the hot gas duct 16 in the direction indicated by arrowhead G (FIG. 1) and directed to a manifold chamber 18 which communicates with the duct through ports 17 and extends around the longitudinal centerline 4 of the engine. The manifold chamber 18 is connected to a hot gas line 20.

Figure 2:
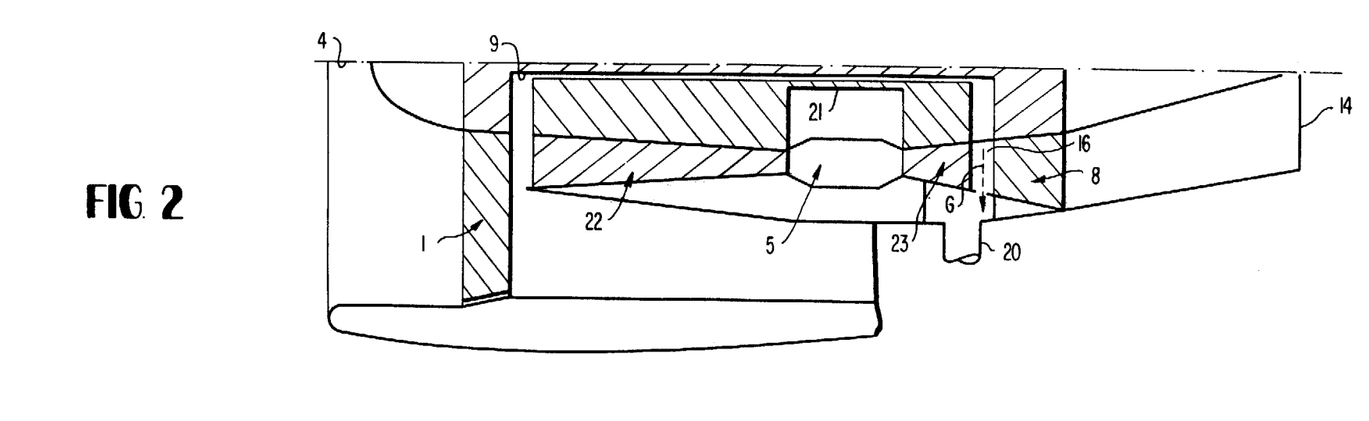
FIG. 2 is a section taken at the engine longitudinal centerline which illustrates the lower half of a schematically arranged turbine jet engine in an alternative embodiment of the present invention.

FIG. 2 employs the same numerals for similar structures as described above for FIG. 1 but differs from FIG. 1 in that the jet engine here illustrated is of two-spool, two-stream construction, where the inner shaft 9 is contained in only one tubular shaft 21 which extends coaxially with the longitudinal centerline 4 of the engine and carries, aft of front fan 1, a multi-stage high-pressure compressor 22 driven by a high pressure turbine 23 disposed between the combustion chamber 5 and the low-pressure turbine 8. The hot gas is here extracted from the hot gas duct 16 at a point between the high-pressure turbine 23 and the low-pressure turbine 8 analogously to FIG. 1, where for clarity of presentation the hot gas duct 20 is here rotated through 180° from its previous (FIG. 1) position on the engine.

Figures 5, 5A:
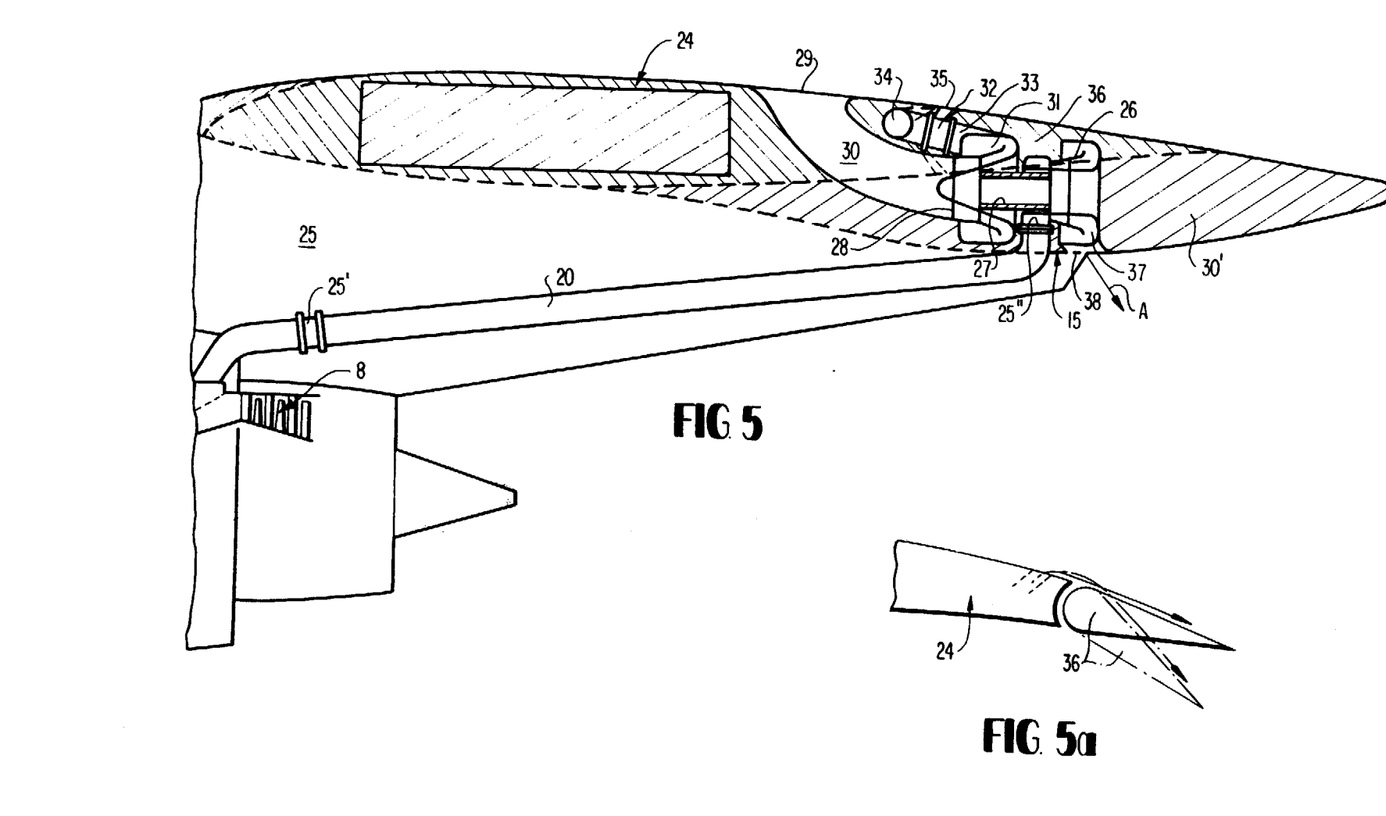
FIG. 5 is a schematic view through an aircraft wing which schematically illustrates the apparatus of this invention with respect to its arrangement on or in the wing of an aircraft.
FIG. 5a is a schematic view of a portion of the FIG. 5 arrangement.

In FIG. 5 the cruise engines of FIG. 1 or 2 are shown arranged on struts 25 below the wing 24. The hot gas line 20 between each cruise engine and its compressed-air generator 15 is disposed inside the strut 25 near its trailing edge.

Figure 6:
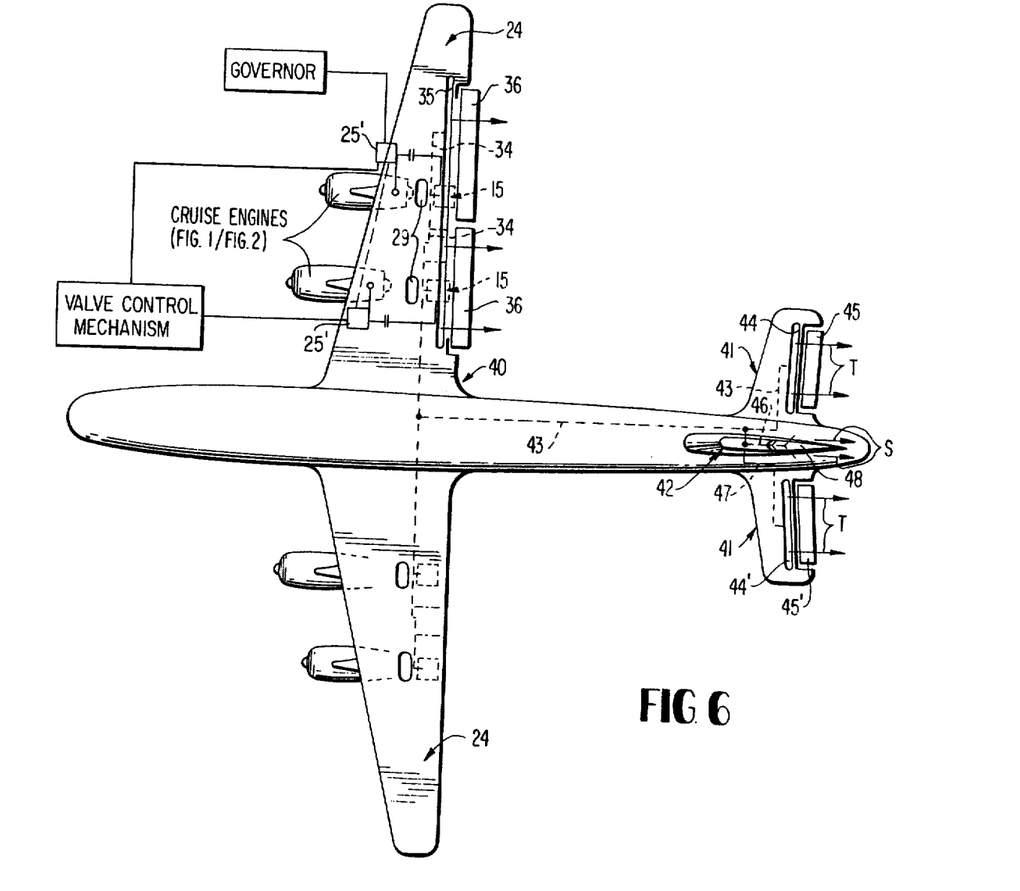
FIG. 6 is a schematic plan view of an aircraft equipped with the apparatus of this invention.

A restrictor type of shut-off valve is arranged in each hot gas line 20. Such a shut-off valve 25' enables the compressed-air generator 15 to be operated at part power as for instance during take-off when the thrust of the cruise engine is high, while during landing, when the cruise engines operate at part power, the shut-off valve 25' is wide open. These valves 25' can be in the form of generally known pivotal throttle flaps, slide valves, plunger valves and the like which are operable by hydraulic, pneumatic or electric valve control means. A common governor is provided for the air supply plant (see FIGS. 6 and 7 for overall configuration) which employs the pressure in manifold line 34 as a pulse for actuating valves 25'. If the pressure in line 34 drops, due to failure/throttling of a cruise engine, the governor counteracts the drop by opening valve 25' associated with engines still in operation until the desired pressure in line 34 is restored. The governor and valve control means are schematically depicted in FIG. 6.

The hot gases extracted from the respective cruise engine during take-off or landing energize through the hot gas line 20 and an inlet spiral 25'' the respective turbine 26 of a compressed-air generator 15, said turbine driving a compressor 28 via a shaft 27. The intake air needed by the compressor 28 is directed to an inlet duct 30 through inlet port 29 in the top of the wing 24. The compressed air produced by the compressor 28 reaches a deflector casing 31 and then, after a check valve 32 has allowed its passage through a ducting 33, a compressed-air manifold line 34.

The compressed air issues from this manifold line 34 through an exhaust slot 35 which extends along the trailing edge of the wing 24. This exhaust air wets the surface of the pivotally mounted trailing edge flap 36 of the wing. FIG. 5a schematically depicts the relationship of the pivotally mounted flap 36 with the slots 35 with arrows indicating the flow of air along the upper surface of flap 36. If flaps 36 are pivoted downwardly for increasing lift at starting and landing, the lift is additionally enhanced by the flow of air from jets 35 in a downward inclination along flaps 36.

The hot gas utilized by the turbine 26 of the compressed-air generator escapes through an exhaust port 38 diagonally downwards (arrowhead A) after it has first passed through an exhaust diffusor 37.

Further benefits from the arrangement of FIG. 5 can be gained by suitably shaping the intake 30 so that the compressor 28 can draw off at least a portion of the boundary layer of air forming on the surface of the wing, compress it and exhaust it through the exhaust slot 35 to promote lift.

As will also become apparent from a study of FIG. 5, each compressed-air generator 15 associated with a cruise engine can be enclosed below the wing end by a flow-promoting or nacelle-shaped fairing 30'.

Figure 3:
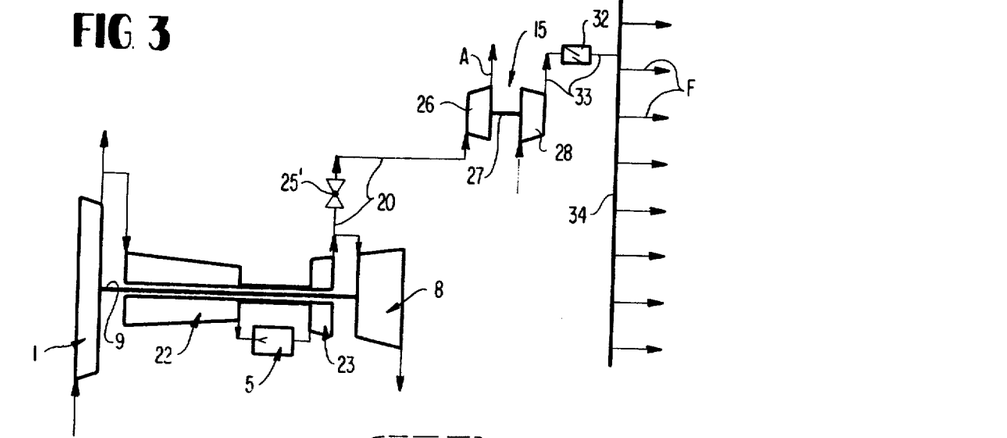
FIG. 3 is a system diagram which illustrates the operation of apparatus arranged in accordance with a preferred embodiment of the present invention.
Figures 4, 8:
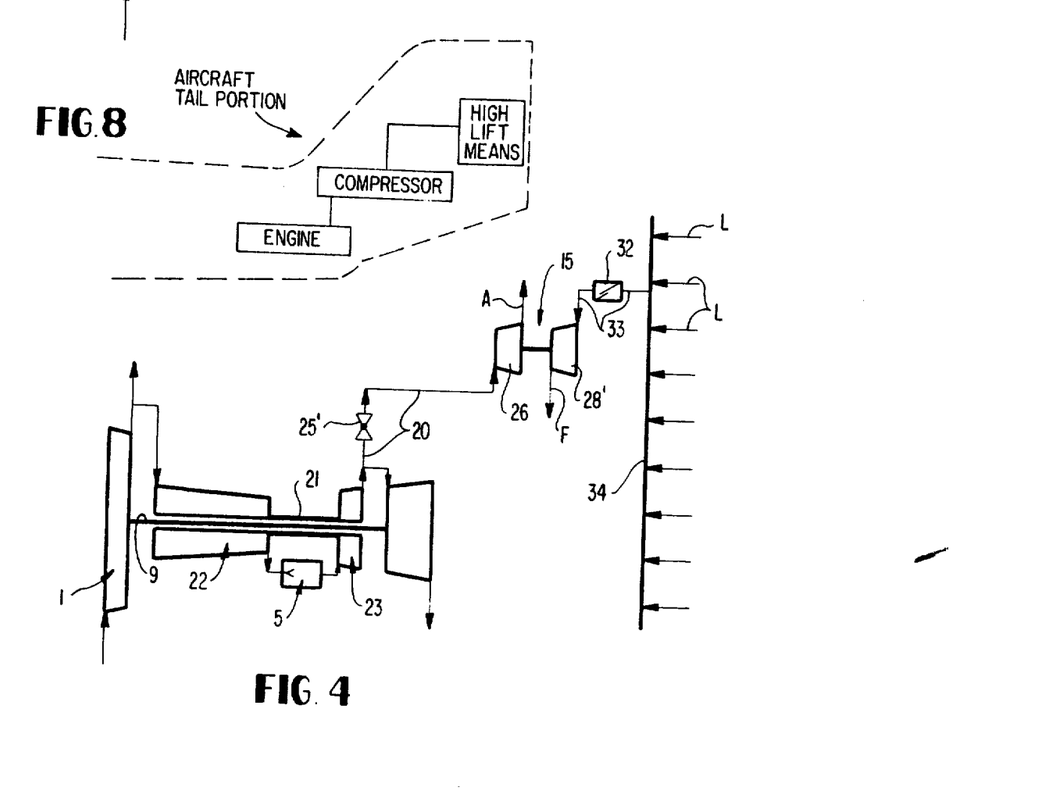
FIG. 4 is a system diagram which illustrates the operation of apparatus arranged in accordance with another preferred embodiment of the present invention.
FIG. 8 is a schematic side view through an aircraft tail portion which schematically illustrates the apparatus of this invention with respect to its arrangement on the tail portion of an aircraft.

FIGS. 3 and 4 are system diagrams using the same reference numerals for similar components of an engine arrangement in accordance with FIG. 2.

Much as in FIG. 5, the embodiment of FIG. 3 likewise serves to augment lift by exhausting compressed air, where the compressed air generator 15 utilizes a turbine 26, which is here arranged on the left-hand side, to drive through a shaft 27 a compressor 28, which is here shown on the right-hand side. The compressor discharges compressed air through a check valve 32 in a line 33 into a manifold line 34 which extends approximately parallel with the trailing edge of the wing.

The manifold line 34 communicates directly with an exhaust slot (35 of FIG. 5) extending along the pivotally mounted trailing edge of the wing. The compressed air is exhausted through this slot (arrowheads F) essentially achieving the lift augmentation effects previously described in connection with FIG. 5.

FIG. 4 illustrates an alternative to FIG. 3 and FIG. 5 in that the turbine 26 drives a suction fan 28' which here replaces the compressor 28 in its compressed-air generating function. The suction fan communicates through the line 33 and check valve 32 therein with the manifold line 34 which in turn connects to suction slots in the top of the wing to draw off the boundary layer of air forming on the wing surface (arrowheads L), to compress it and then exhaust it from the wing (FIG. 5) in the direction of arrowhead F (FIG. 3) to augment the lift.

FIG. 6 is a top view of an aircraft 40 which illustrates in greater detail the use of the apparatus of this invention according to FIG. 5 in conjunction with the aircraft 40. Underneath each wing 24, respectively two cruise engines are disposed of the design according to FIG. 1 or FIG. 2.

FIG. 6 schematically illustrates how the elevator 41, as well as the vertical rudder 42 are affected by the present invention. For this purpose, a further compressed-air line 43 is connected to the manifold 34 connecting all compressors 28 (see FIG. 5) of the compressed-air generators 15. This compressed-air line 43, on the one hand, leads to the exhaust slot 44, upstream of the right elevator flap 45. Furthermore, conduits 46, 47 branch off from this compressed-air line 43, of which 46 is extended into the pivotable portion 48 of the vertical rudder 42 and sweeps over the latter by way of lateral exhaust openings, not shown, in the direction of arrows S. The conduit 47 leads to an exhaust slot 44' which is arranged upstream of the left elevator flap 45'.

The air jets escaping from the exhaust slots 44, 44' (arrows T) support the operation of the pivotable flaps 45, 45' for purposes of controlling the aircraft.

Figure 7:
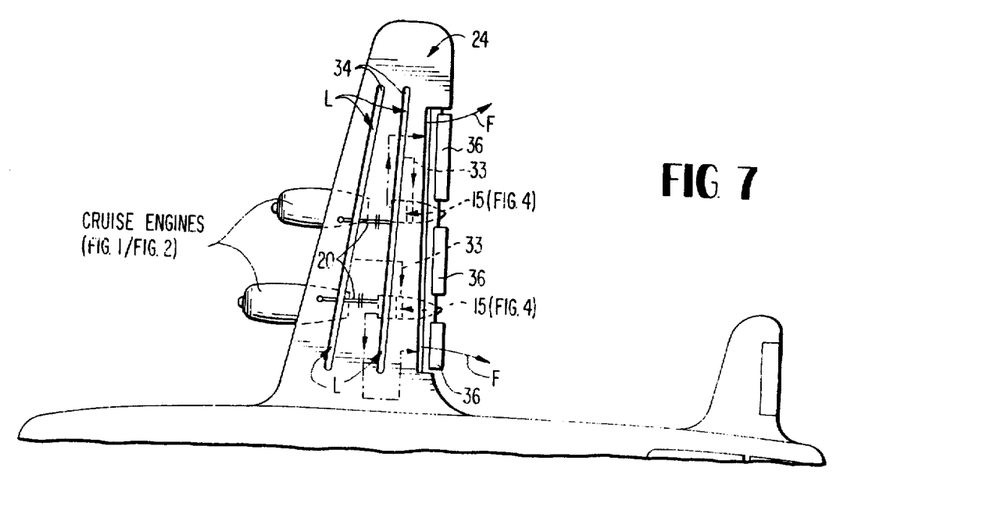
FIG. 7 is a schematic plan view of part of an aircraft which is equipped in accordance with the embodiment of FIG. 4.

With the use of cruise engines in the design of FIG. 1 or FIG. 2, FIG. 7 illustrates the use of the arrangement according to FIG. 4 of this invention in an aircraft, which in this case is merely shown in a plan view and only as one-half of the entire structure.

FIG. 8 illustrates use of the apparatus of the invention in the tail portion of an aircraft.

While I have shown and described only several embodiments in accordance with the present invention, it is understood that the same is not limited thereto but also contemplates numerous changes and modifications as would be known to those skilled in the art given the present disclosure of the invention, and I therefore do not wish to be limited to the details shown and described herein only schematically but intend to cover all such changes and modifications.

I claim:

1. Apparatus for augmenting the lift of an aircraft having at least one cruise engine of the type having a plurality of turbines driven by hot combustion gases from the engine; said apparatus comprising:
    compressed air generator means separate from said engine,
    high lift means including air flow directing means for directing air flow energized by said compressed air generator means,
    hot gas extraction means for extracting a portion of the hot gases from said engine at a position upstream of a low pressure one of said turbines,
    and hot gas conducting means for conducting said portion of the hot gases to said compressed air generator means to drive said compressed air generator means,
    wherein said at least one cruise engine is of multiple-spool, multiple-stream construction with said turbines being arranged in series with one another, and wherein said hot gas extraction means includes means for extracting said portion of the hot gases at a position intermediate the most downstream and the second most downstream of said turbines, said most downstream turbine being said low pressure one of said turbines.

2. Apparatus according to claim 1, wherein said hot gas extraction means includes an annular extraction chamber surrounding each of said at least one cruise engines, and a plurality of small holes for communicating each of said respective annular extraction chambers with a respective flow duct immediately upstream of a respective one of said low pressure one of said turbines, and wherein said hot gas conducting means includes a hot gas line leading from each of said extraction chambers to said compressed air generator means.

3. Apparatus according to claim 2, wherein said hot gas conducting means further includes restrictor type shut-off valves in each of said hot gas lines and control means for placing said valves in a restricting position during aircraft take-off with high cruise engine thrust conditions and in a wide open position during aircraft landing with lower cruise engine thrust conditions.

4. Apparatus according to claim 1, wherein said at least one cruise engine is suspended under lifting wing means of the aircraft by struts, and wherein said hot gas conducting means includes a hot gas line leading from each of said engines to said compressed air generator means through respective ones of said struts near respective trailing edges of said struts.

5. Apparatus according to claim 2, further comprising struts for suspending each of said at least one cruise engines under lifting wing means of the aircraft, and wherein each of said respective hot gas lines lead from respective ones of said engines to said compressed air generator means through respective ones of said struts near respective trailing edges of said struts.

6. Apparatus according to claim 1, wherein at least one of said cruise engines is installed together with an associated one of said compressed air generator means in a tail portion of the aircraft.

7. Apparatus according to claim 5, wherein at least one of said cruise engines is installed together with an associated one of said compressed air generator means in a tail portion of the aircraft.

8. Apparatus according to claim 1, wherein said compressed air generator means includes generator turbine means driven by said portion of the hot gases supplied by the hot gas conducting means, and wherein said compressed air generator means are arranged at least partially within trailing ends of the wing means of the aircraft.

9. Apparatus according to claim 3, wherein said compressed air generator means includes generator turbine means driven by said portion of the hot gases supplied by the hot gas conducting means, and wherein said compressed air generator means are arranged at least partially within trailing ends of the wing means of the aircraft.

10. Apparatus according to claim 5, wherein said compressed air generator means includes generator turbine means driven by said portion of the hot gases supplied by the hot gas conducting means, and wherein said compressed air generator means are arranged at least partially within trailing ends of the wing means of the aircraft.

11. Apparatus according to claim 1, wherein said high lift means includes suction slots on wing means of the aircraft for removing portions of the boundary layer of air on said wing means.

12. Apparatus according to claim 11, wherein said suction slots are connected with a common manifold line within the wing means, and wherein said common manifold line is connected with said compressed air generator means such that said compressed air generator means effects a suction at said suction slots to remove said portions of the boundary layer.

13. Apparatus according to claim 12, wherein said compressed air generator means includes a plurality of separate generators corresponding to a plurality of cruise engines and connected with said common manifold line.

14. Apparatus according to claim 11, wherein at least one cruise engine is suspended under lifting wing means of the aircraft by struts, and wherein said hot gas conducting means includes a hot gas line leading from each of said engines to said compressed air generator means through respective ones of said struts near respective trailing edges of said struts.

15. Apparatus according to claim 14, wherein said suction slots are connected with a common manifold line within the wing means, and wherein said common manifold line is connected with said compressed air generator means such that said compressed air generator means effects a suction at said suction slots to remove said portions of the boundary layer.

16. Apparatus according to claim 11, wherein said compressed air generator means includes generator turbine means driven by said portion of the hot gases supplied by the hot gas conducting means, and wherein said compressed air generator means are arranged at least partially within trailing ends of the wing means of the aircraft.

17. Apparatus according to claim 1, wherein said high lift means includes exhaust slots along the top of wing means of the aircraft for exhausting air energized by said compressed air generator means.

18. Apparatus according to claim 17, wherein said exhaust slots are connected with a common manifold line within the wing means, said common manifold line being connected to a plurality of separate generators of said compressed air generator means.

19. Apparatus according to claim 17, wherein said at least one cruise engine is suspended under lifting wing means of the aircraft by struts, and wherein said hot gas conducting means includes a hot gas line leading from each of said engines to said compressed air generator means through respective ones of said struts near respective trailing edges of said struts.

20. Apparatus according to claim 19, wherein a hot gas line and associated separate generator is provided for each of said engines.

21. Apparatus according to claim 19, wherein each of said separate generators includes a generator turbine driven by hot gases from respective ones of said hot gas lines and a generator exhaust separate from said exhaust slots for exhausting hot gases from said turbine.

22. Apparatus according to claim 1, wherein said air flow directing means includes a manifold line communicating with a plurality of generators of said compressed air generator means and a check valve arranged between each of said generators and said manifold line.

23. Apparatus according to claim 11, wherein said air flow directing means includes a manifold line communicating with a plurality of generators of said compressed air generator means and a check valve arranged between each of said generators and said manifold line, said suction slots communicating with said manifold line.

24. Apparatus according to claim 17, wherein said air flow directing means includes a manifold line communicating with a plurality of generators of said compressed air generator means and a check valve arranged between each of said generators and said manifold line, said exhaust slots communicating with said manifold line.

25. Apparatus according to claim 1, wherein ambient air is supplied to said compressed air generator means through port means in the top of wing means of the aircraft and inlet duct means.

26. Apparatus according to claim 25, wherein said compressed air generator means includes a plurality of separate generators driven by hot gases extracted from respective separate cruising engines of the aircraft, and wherein said port means and inlet duct means include separate ports and inlet ducts for each of said generators.

27. Apparatus according to claim 26, wherein said high lift means includes suction slots on wing means of the aircraft for removing portions of the boundary layer of air on said wing means.

28. Apparatus according to claim 26, wherein said high lift means includes exhaust slots along the top of wing means of the aircraft for exhausting air energized by said compressed air generator means.

29. Apparatus according to claim 1, wherein at least a portion of the air for the high lift means is gained from the boundary layer of air removed off of the upper side of the wing and compressed by the compressed air generator means and then directed by said air flow directing means to said high lift means.

30. Apparatus according to claim 11, wherein said compressed air generator means are at least partially enclosed in wing means of the aircraft, and wherein the boundary layer of air on said wing means can be drawn off by the compressors of said compressed air generator means from a position in the wings downstream of the suction slots.

31. Apparatus according to claim 17, wherein said compressed air generator means are at least partially enclosed in wing means of the aircraft, and wherein the boundary layer of air on said wing means can be drawn off by the compressors of said compressed air generator means from a position in the wings downstream of the exhaust slots.

32. Apparatus according to claim 11, wherein said high lift means further includes exhaust slots at the upper side of said wing means, and wherein said compressed air generator means sucks ambient air from the boundary layer through said suction slots, compresses said air, and exhausts said air through said exhaust slots.

33. Apparatus according to claim 32, wherein said exhaust slots are located downstream of said suction slots on the upper side of said wing means.

34. Apparatus according to claim 33, wherein said compressed air generator means includes a separate turbine type generator for each of a plurality of said cruise engines, and wherein said hot gas conducting means includes a separate hot gas line leading from each of said engines to drive the turbine of respective associated compressed air generator means.

35. Apparatus according to claim 1, wherein said hot gas conducting means includes a hot gas line leading from each of said at least one cruise engines to said compressed air generator means, wherein said hot gas conducting means further includes resistor type shut-off valves in each of said hot gas lines and control means for placing said valves in a restricting position during aircraft take-off with high cruise engine thrust conditions and in a wide open position during aircraft landing with lower cruise engine thrust conditions, and wherein said aircraft includes a plurality of cruise engines, further comprising control means for controlling the throttling action of respective shut-off valves of each of said engines as a function of the magnitude of hot gas extraction from other of said engines whereby reduction of hot gas extraction from an engine is accommodated for by increased hot gas extraction from the remaining engines.

36. Apparatus for augmenting the lift of an aircraft having at least one cruise engine of the type having a plurality of turbines driven by hot combustion gases from the engine; said apparatus comprising:
   compressed air generator means separate from said engine,
   high lift means including air flow directing means for directing air flow energized by said compressed air generator means,
   hot gas extraction means for extracting a portion of the hot gases from said engine at a position upstream of a low pressure one of said turbines,
   and hot gas conducting means for conducting said portion of the hot gases to said compressed air generator means to drive said compressed air generator means,
   wherein said hot gas conducting means includes a hot gas line leading from each of said at least one cruise engines to said compressed air generator means,
   wherein said hot gas conducting means further includes restrictor type shut-off valves in each of said hot gas lines and control means for placing said valves in a restricting position during aircraft take-off with high cruise engine thrust conditions and in a wide open position during aircraft landing with lower cruise engine thrust conditions,
   wherein said aircraft includes a plurality of cruise engines, further comprising control means for controlling the throttling action of respective shut-off valves of each of said engines as a function of the magnitude of hot gas extraction from other of said engines whereby reduction of hot gas extraction from an engine is accommodated for by increased hot gas extraction from the remaining engine.

37. Apparatus according to claim 36, wherein at least one of said cruise engines is installed together with an associated one of said compressed air generator means in a tail portion of the aircraft.

38. Apparatus according to claim 36, wherein said hot gas extraction means includes an annular extraction chamber surrounding each of said at least one cruise engines, and a plurality of small holes for communicating each of said respective annular extraction chamber with a respective flow duct immediately upstream of the respective one of said low pressure one of said turbines, and wherein each of said hot gas lines leads from respective ones of said extraction chambers to said compressed air generator means.

39. A method of augmenting the lift of an aircraft having at least one cruise engine of the type having a plurality of turbines driven by hot combustion gases from the engine and of multiple-spool, multiple construction with said turbines arranged in series with one another; said method comprising:
   extracting hot gases from said engine at a position intermediate the most downstream and the second most downstream of said turbines, said most downstream of said turbines being a low pressure one of said turbines,
   driving compressed air generator means separate from said engine by directing said extracted hot gases thereto.
   and energizing high lift means with said compressed air generator means effecting at least one of suction of boundary layer air from a wing means of said aircraft and exhausting of compressed air over the surface of said wing means.

* * * * *